United States Patent
Young

(10) Patent No.: US 6,885,651 B1
(45) Date of Patent: Apr. 26, 2005

(54) MAINTAINING AN ADAPTIVE BROADCAST CHANNEL USING BOTH TRANSMITTER DIRECTED AND RECEIVER DIRECTED BROADCASTS

(75) Inventor: C. David Young, Plano, TX (US)

(73) Assignee: Rockwell Collins, Cedar Rapids, IA (US)

( * ) Notice: Subject to any disclaimer, the term of this patent is extended or adjusted under 35 U.S.C. 154(b) by 932 days.

(21) Appl. No.: 09/649,802

(22) Filed: Aug. 29, 2000

(51) Int. Cl.[7] .......................... H04B 7/212; H04J 3/00
(52) U.S. Cl. ...................................... 370/337; 370/348
(58) Field of Search ................................ 370/336, 337, 370/347, 348

(56) References Cited

U.S. PATENT DOCUMENTS

| | | | |
|---|---|---|---|
| 4,504,946 A | 3/1985 | Raychaudhuri | 370/322 |
| 4,763,322 A | 8/1988 | Eizenhofer | 370/337 |
| 5,012,469 A * | 4/1991 | Sardana | 370/322 |
| 5,117,422 A | 5/1992 | Hauptschein et al. | 370/255 |
| 5,245,609 A | 9/1993 | Ofek et al. | 370/348 |
| 5,295,140 A | 3/1994 | Crisler et al. | 370/443 |
| 5,396,496 A | 3/1995 | Ito et al. | 370/314 |
| 5,420,858 A | 5/1995 | Marshall et al. | 370/352 |
| 5,448,698 A | 9/1995 | Wilkes | 395/200.01 |
| 5,450,394 A | 9/1995 | Gruber et al. | 370/17 |
| 5,457,681 A | 10/1995 | Gaddis et al. | 370/402 |
| 5,502,722 A * | 3/1996 | Fulghum | 370/343 |
| 5,506,848 A | 4/1996 | Drakopolous et al. | 370/336 |
| 5,568,477 A | 10/1996 | Galand et al. | 370/60 |
| 5,581,548 A | 12/1996 | Ugland et al. | 370/330 |
| 5,594,720 A | 1/1997 | Papadopolous et al. | 370/330 |
| 5,598,417 A | 1/1997 | Crisler et al. | 370/348 |
| 5,613,198 A * | 3/1997 | Ahmadi et al. | 370/337 |
| 5,625,629 A | 4/1997 | Wenk | 370/330 |
| 5,644,576 A * | 7/1997 | Bauchot et al. | 370/437 |
| 5,652,751 A | 7/1997 | Sharony | 340/2.4 |
| 5,696,903 A | 12/1997 | Mahany | 709/228 |
| 5,719,868 A * | 2/1998 | Young | 370/436 |
| 5,748,362 A | 5/1998 | Delacourt et al. | 359/326 |
| 5,909,469 A | 6/1999 | Frodigh et al. | 375/302 |

(Continued)

OTHER PUBLICATIONS

I. Chlamtac and A. Farago, "An Optimal Access Protocol With Multiple Reception Capacity," University of Massachusetts, date uncertain, but is estimated to be 1993–1994.

U.S. Appl. No. 09/340,585, "A Method And Apparatus For Managing Communication Resources Using An Adaptive Broadcast Cycle (ABC)", filed Jun. 28, 1999, C. David Young et al.

U.S. Appl. No. 09/552,144, "Method And Apparatus For Assigning Receive Slots In A Dynamic Assignment Environment", filed Apr. 19, 2000, C. David Young et al.

(Continued)

Primary Examiner—Chau Nguyen
Assistant Examiner—Blanche Wong
(74) Attorney, Agent, or Firm—Nathan O. Jensen; Kyle Eppele

(57) ABSTRACT

A protocol disclosed for managing an adaptive broadcast channel in a network having nodes communicating via scheduled time slots on a time multiplex basis. The protocol is suitable for use with a dynamic assignment protocol such as USAP. The protocol permits the use of transmitter based broadcasts and receiver directed broadcasts during the same frame. Further, embodiments for implementing explicit and implicit reservation schemes are disclosed. Further still, a technique for increasing efficiency through implementation of an optimized receiver directed broadcast schedule is disclosed.

11 Claims, 7 Drawing Sheets

U.S. PATENT DOCUMENTS

| | | | |
|---|---|---|---|
| 5,920,703 A | | 7/1999 | Campbell et al. ............ 709/236 |
| 5,949,760 A | * | 9/1999 | Stevens et al. .............. 370/254 |
| 5,953,344 A | | 9/1999 | Dail et al. ................... 370/337 |
| 5,983,259 A | | 11/1999 | Campbell et al. ............ 709/200 |
| 6,014,089 A | | 1/2000 | Tracy et al. ............ 340/870.02 |
| 6,018,528 A | | 1/2000 | Gitlin et al. ................. 370/436 |
| 6,031,827 A | | 2/2000 | Rikkinen et al. ............ 370/330 |
| 6,084,888 A | | 7/2000 | Watanabe et al. ............ 370/473 |
| 6,084,889 A | | 7/2000 | Murakami ................... 370/474 |
| 6,088,659 A | | 7/2000 | Kelley et al. ................. 702/62 |
| 6,094,425 A | | 7/2000 | Auger et al. ................. 370/330 |
| 6,094,429 A | * | 7/2000 | Blanchette et al. .......... 370/347 |
| 6,122,293 A | | 9/2000 | Frodigh et al. .............. 370/473 |
| 6,151,319 A | | 11/2000 | Dommety et al. ..... 370/395.52 |
| 6,157,656 A | | 12/2000 | Lindgren et al. ............ 370/458 |
| 6,252,868 B1 | | 6/2001 | Diachina et al. ............. 370/347 |
| 6,256,304 B1 | * | 7/2001 | Vayrynen ..................... 370/350 |
| 6,256,477 B1 | * | 7/2001 | Eidson et al. ............... 455/63.3 |
| 6,275,506 B1 | | 8/2001 | Fazel et al. .................. 370/459 |
| 6,304,559 B1 | | 10/2001 | Jacklin et al. ............... 370/310 |
| 6,310,867 B1 | | 10/2001 | Tat et al. ..................... 370/254 |
| 6,314,084 B1 | | 11/2001 | Kahale et al. ............... 370/230 |
| 6,317,436 B1 | * | 11/2001 | Young et al. ................ 370/443 |
| 6,324,184 B1 | | 11/2001 | Hou et al. ................... 340/7.43 |
| 6,331,973 B1 | * | 12/2001 | Young et al. ................ 370/337 |
| 6,353,598 B1 | | 3/2002 | Baden et al. ................ 370/280 |
| 6,353,605 B1 | | 3/2002 | Rautanen et al. ............ 370/337 |
| 6,369,719 B1 | | 4/2002 | Tracy et al. ............ 340/870.02 |
| 6,384,739 B1 | | 5/2002 | Roberts, Jr. et al. ........ 340/905 |
| 6,389,273 B1 | * | 5/2002 | Brandenburg ............... 455/269 |
| 6,414,955 B1 | * | 7/2002 | Clare et al. .................. 370/390 |
| 6,442,157 B1 | * | 8/2002 | Carter et al. ................. 370/347 |
| 6,466,793 B1 | * | 10/2002 | Wallstedt et al. ............ 455/450 |
| 6,487,186 B1 | * | 11/2002 | Young et al. ................ 370/336 |
| 6,489,996 B1 | | 12/2002 | Dupuy ........................ 370/337 |
| 6,498,667 B1 | | 12/2002 | Masucci et al. .............. 398/98 |
| 6,504,829 B1 | * | 1/2003 | Young et al. ................ 370/337 |
| 6,515,972 B1 | | 2/2003 | Gage et al. .................. 370/328 |
| 6,529,443 B1 | | 3/2003 | Downey et al. .............. 367/76 |
| 6,553,424 B1 | * | 4/2003 | Kranz et al. ................. 709/234 |
| 6,556,899 B1 | | 4/2003 | Harvey et al. ................. 701/29 |
| 6,574,199 B1 | * | 6/2003 | Young et al. ................ 370/254 |
| 6,574,206 B1 | * | 6/2003 | Young ......................... 370/337 |
| 6,600,754 B1 | * | 7/2003 | Young et al. ................ 370/459 |
| 6,628,636 B1 | * | 9/2003 | Young ......................... 370/337 |
| 6,631,124 B1 | | 10/2003 | Koorapaty et al. .......... 370/337 |
| 6,643,322 B1 | | 11/2003 | Varma et al. ................ 375/227 |
| 6,711,177 B1 | | 3/2004 | Young ......................... 370/468 |
| 2002/0001294 A1 | | 1/2002 | Amouris ...................... 370/337 |
| 2002/0046381 A1 | | 4/2002 | Morris et al. ................ 714/752 |
| 2003/0067906 A1 | * | 4/2003 | Young ......................... 370/347 |
| 2003/0202574 A1 | | 10/2003 | Budka et al. ................ 375/227 |

OTHER PUBLICATIONS

U.S. Appl. No. 09/650,332, "Scheduling Techniques For Receiver Directed Broadcast Applications", C. David Young, filed on an even date herewith.

Chakraborty et al. "Generic Algorithm for Broadcast Scheduling in Packet Radio Networks," Evolutionary Computation Proceedings, 1998: IEEE World Congress on Computational Intelligence. May 4–9, 1998. pp. 183–188.

Pond et al. "A Distributed Time–Slot Assignment Protocol for Mobile Multi–Hop Broadcast Packet Radio Networks," IEEE MILCOM, 1989. Oct. 15–18, 1989. pp. 70–74.

Arikan, E. "Some Complexity Results about Packet Radio Networks," IEEE Transactions on Information Theory, v.IT–30, No. 4, Jul. 1984, pp. 681–685.

Chou et al. "Slot Allocation Strategies for TDMA Protocols in Multihop Packet Radio Network." Eleventh Annual Joint Conference of the IEEE Computer and Communications Societies. May 4–8, 1992. pp. 710–716.

Oono et al. "Dynamic Slot Allocation Technology for Mobile Multi–Media TDMA Systems Using Distributed Control Scheme," IEEE. Oct. 12–16, 1997. pp. 74–78.

Young, "USAP: A Unifying Dynamic Distributed Multichannel TDMA Slot Assignment Protocol," IEEE Proc. MILCOM 1996, vol. 1, Oct. 1996.

Bittle, Caples, Young, "Soldier Phone: An Innovative Approach to Wireless Multimedia Communications," 1998 IEEE MILCOM, vol. 3.

Sunlin, "A Hybrid Distributed Slot Assignment TDMA Channel Access Protocol," IEEE Military Communications Conference, 1990, vol. 3 of 3.

Young and Stevens, "Clique Activation Multiple Access (CAMA): A Distributed Heuristic for Building Wireless Datagram Networks," IEEE Military Communications Conference 1998, vol. 1.

Ju et al. "An Optimal Topology–Transport Scheduling Method in Multihop Packet Radio Networks." IEEE/ACM Transactions on Networking. Jun. 1998. pp. 298–306.

\* cited by examiner

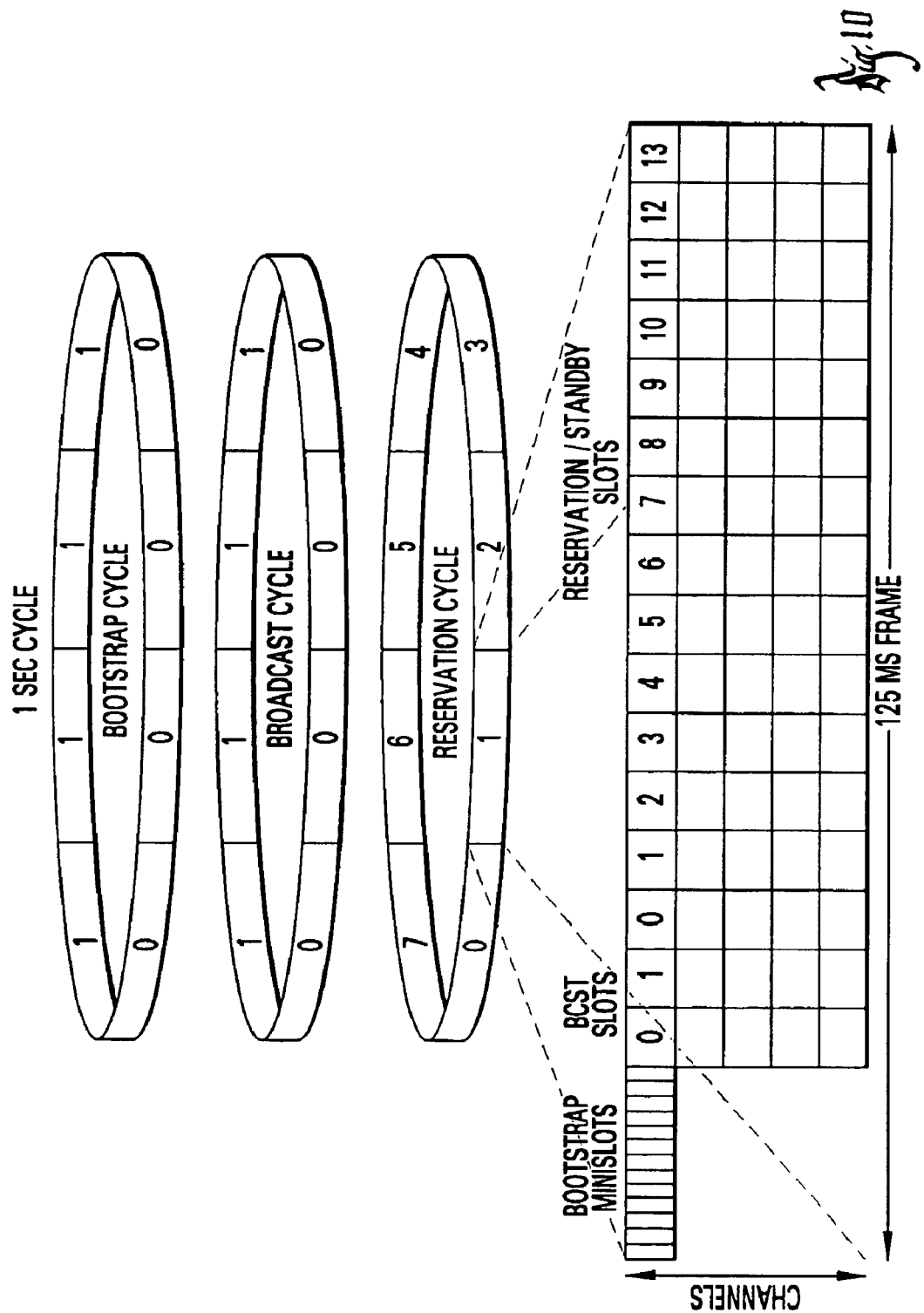

US 6,885,651 B1

MAINTAINING AN ADAPTIVE BROADCAST CHANNEL USING BOTH TRANSMITTER DIRECTED AND RECEIVER DIRECTED BROADCASTS

REFERENCE TO RELATED APPLICATIONS

Cross-reference is made to related U.S. Pat. No. 6,317, 436; U.S. application Ser. No. 09/552,144, filed Apr. 19, 2000 now U.S. Pat. No. 6,741,994; and an application entitled "Scheduling Techniques For Receiver Directed Broadcast Applications" by C. David Young filed on even date herewith.

FIELD OF THE INVENTION

The present invention generally relates to an improved dynamic assignment protocol, more particularly relates to a protocol using both transmitter based broadcasts and receiver directed broadcasts, and even more particularly relates to a USAP Multiple Broadcast Access protocol.

BACKGROUND OF THE INVENTION

Mobile multi-hop packet radio networks are known for rapid and convenient deployment, self-organization, mobility, and survivability. Such a network is illustrated in FIG. 1. A transmission from one node, from node $N_1$ of FIG. 1 for example, can be broadcast to all nodes in its "neighborhood." Ultra-high frequency (UHF) systems generally have a neighborhood defined by nodes located within line of sight of the transmitting node. The nodes of such a neighborhood are said to be located within one "hop" of the transmitting node. In FIG. 1, for example, nodes $N_1$, $N_3$, $N_4$, $N_5$, $N_6$, $N_7$ and $N_8$ are members of the neighborhood surrounding node $N_1$.

Nodes $N_2$, $N_9$, $N_{10}$, $N_{11}$ and $N_{12}$ are each located two hops away from node $N_1$ and node $N_{13}$ can be said to be three hops away from node $N_1$. When data transmitted from node $N_1$ is to be propagated multiple hops, the data must be relayed by one or more of node $N_1$'s neighbors. For example, data transmitted by node $N_1$ can be relayed by its neighbor node $N_8$ to a node such as node $N_{12}$ that is located two hops from node $N_1$.

Receivers are generally capable of processing only one transmission at a time. When using such receivers, simultaneous transmissions (also known as collisions, contentions or conflicts) can be avoided by assigning a specific transmission time slot to each communicating node. Several approaches have been developed for assigning slots to nodes. The approach chosen for a particular application is generally a consequence of the type of network application (broadcast, multicast, unicast, datagrams, virtual circuits, etc.) at issue. Since the problem of optimally assigning slots is mathematically intractable, a heuristic approach has been applied This approach resulted in the development of an integrated protocol that both chooses the number of slots to assign to each neighboring node and coordinates their activation in the network.

Many applications require self-organizing, wireless networks that can operate in dynamic environments and provide peer-to-peer, multi-hop, multi-media communications. Key to this technology is the ability of neighboring nodes to transmit without interference. Neighboring nodes transmit without interference by choosing time slots and channels that do not cause collisions at the intended unicast or multicast receivers, The Unifying Slot Assignment Protocol (USAP), which is disclosed in U.S. Pat. No. 5,719,868, provides a protocol establishing such a communication system. USAP is a dynamic assignment protocol that monitors the RF environment and allocates channel resources on demand. It automatically detects and resolves contention between nodes for time slots, such contention arising for example from changes in connectivity. U.S. Pat. No. 5,719,868, issued Feb. 17, 1998, is hereby incorporated herein by reference in its entirety, including all drawings and appendices.

USAP permits a node to assign itself transmit slots based on information it has regarding when it is assigned to transmit and receive and when a neighboring node is scheduled to transmit. In one embodiment of USAP, receiver directed broadcast (RDB), a node can assign itself a receive slot instead of a transmit slot. For example, a node may need to assign itself a receive slot wherein it can receive from one, some or even all of its neighbors. This receiver directed type of assignment is disclosed in application Ser. No. 09/552, 144, filed Apr. 19, 2000. The specification, including all drawing figures, of application Ser. No. 09/552,144, filed Apr. 19, 2000, is hereby incorporated herein by reference in its entirety.

There exists a need for further refinements and improvements to dynamic assignment protocol based systems. More particularly, there exists a need for a system requiring less overhead and greater efficiency. Further, there exists a need for a technique that can implicitly reserve slots, for use in virtual circuits for example, in such a system. In addition, there exists a need to maximize throughput in systems using RDB schemes. These needs are addressed and fulfilled by the detailed description provided below.

SUMMARY OF THE INVENTION

It is an object of the present invention to provide an improved dynamic assignment protocol.

It is a feature of the present invention to utilize both transmitter based broadcasts and receiver directed broadcasts within the same frame.

It is an advantage of the present invention to enable utilization of a more efficient protocol requiring less overhead.

The present invention involves an improved dynamic assignment protocol. It is carried out in an efficient, "wasteless" manner in the sense that scheduling overhead is reduced.

BRIEF DESCRIPTION OF THE DRAWINGS

The invention may be more fully understood by reading the following description of the invention, in conjunction with the appended drawings wherein:

FIG. 10 depicts a frame suitable for use with the optimized eight node schedule of FIG. 9.

DETAILED DESCRIPTION

Prior to the development of USAP, a heuristic approach was typically taken to design an application specific protocol that both chose the number of time slots to assign to each neighboring node and coordinated their activation. The USAP approach separates the slot assignment mechanism from the heuristic and creates a single generalized protocol for reliably choosing the slots and coordinating their activation. A dynamic assignment protocol such as USAP can be used to support higher-level heuristics.

A node can transmit to its neighbors via essentially one of two different methods. One method, node activation, allows only one active transmitter in a neighborhood in a given time slot. The other method, link activation, can permit more than one simultaneous transmission in the same time slot.

Figure 1:
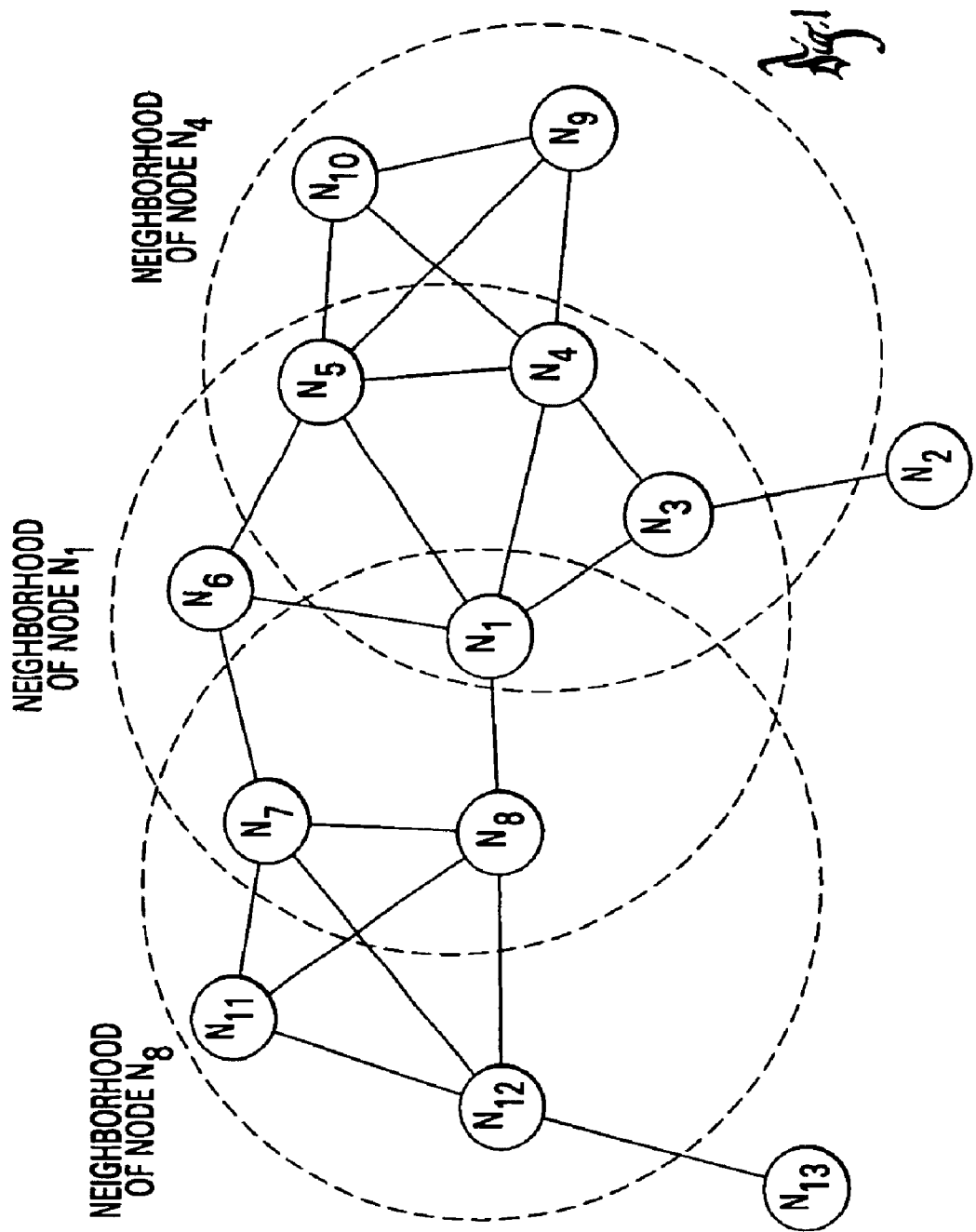
FIG. 1 is a diagram of a network of nodes, the diagram also illustrating the neighborhood associated with three of the nodes.
Figure 2:
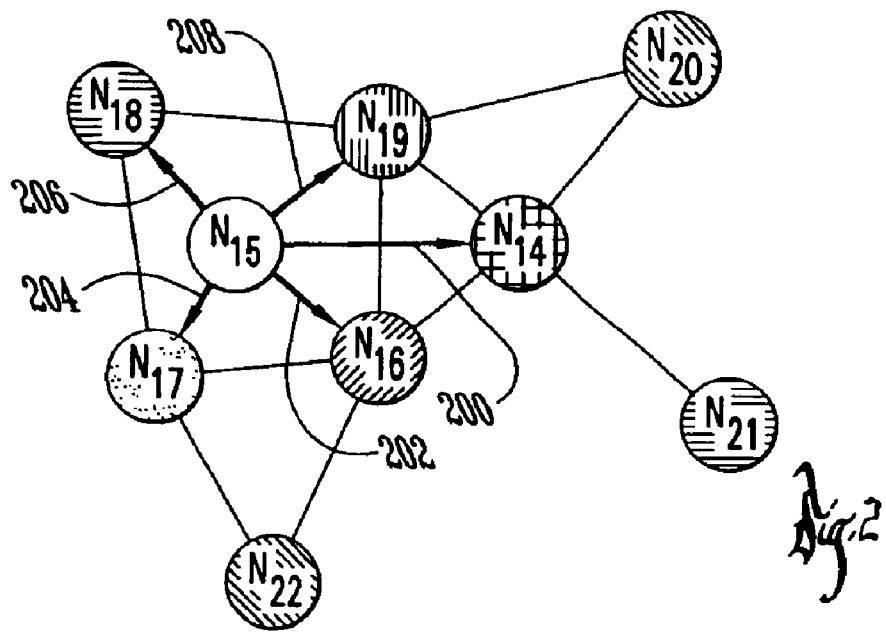
FIG. 2 is a diagram illustrating a node activation form of communication.

In the node activation technique, a single transmitting node communicates data to all of its neighbors simultaneously rather than on an individual basis. Node activation, also known as multicast or broadcast communication, is especially well suited for applications like address resolution and conferencing. The node activation technique is illustrated in FIG. 2. In FIG. 2, a transmitting node $N_{15}$ is simultaneously sending 200, 202, 204, 206, 208 the same broadcast communication to each of its neighbor nodes $N_{14}$, $N_{16}$, $N_{17}$, $N_{18}$ and $N_{19}$.

Figure 3:
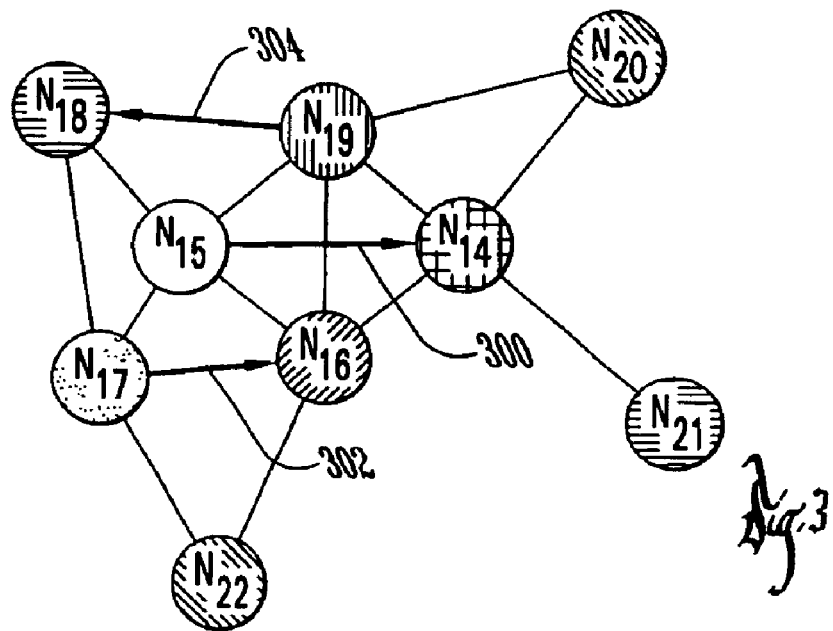
FIG. 3 is a diagram illustrating a link activation form of communication.

In the link activation technique, the transmitting node has only one intended receiver. Link activation, also known as unicast communication, better serves high volume point-to-point traffic. The link activation technique is illustrated in FIG. 3. In FIG. 3, three unicast transmissions are occurring simultaneously. Node $N_{15}$ is transmitting a unicast message 300 to node $N_{14}$, node $N_{17}$ is transmitting a unicast message 302 to node $N_{16}$ and node $N_{19}$ is transmitting a unicast message 304 to node $N_{18}$.

Figure 4:
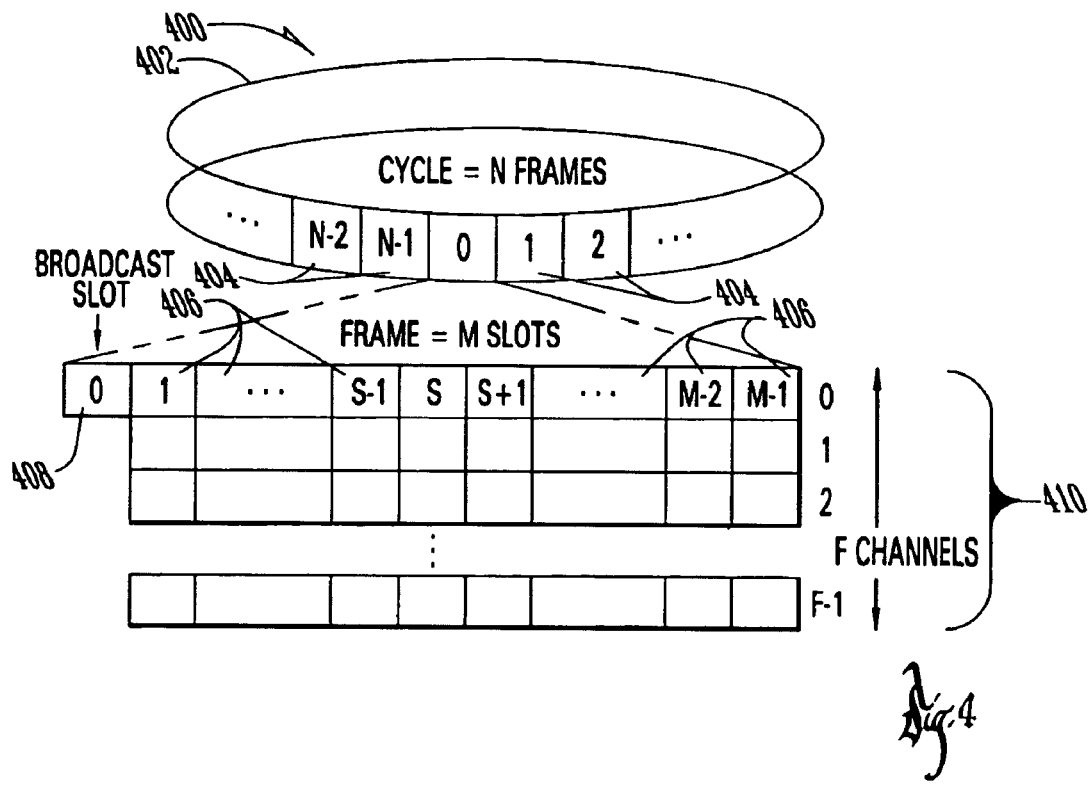
FIG. 4 is a diagram depicting an example of a time division multiple access structure that can be utilized with a dynamic assignment protocol such as USAP.

Referring to FIG. 4, a time multiplex structure 400 suitable for use with USAP is depicted. The time multiplex structure 400 of FIG. 4 is a time division multiple access (TDMA) structure. One cycle 402 of the structure 400 includes "N" frames 404. The number of frames 404 required for a particular embodiment is determined by the specifics of the underlying application.

FIG. 4 also illustrates the structure of a representative frame of the cycle. The time allocated to the representative frame is shown divided into "M" distinct time slots 406. It will be appreciated that different numbers of time slots can be used in the various embodiments of the invention. The first slot of each frame 404 of the cycle 402 is a broadcast slot 408 for network management control packets. One of the N broadcast slots 408 is assigned to each node in the network. Therefore, for a network having N nodes, each node can transmit control packets once during each cycle 402. More than one broadcast slot per frame can be used if it is desired that each node have more broadcast capacity per cycle 402 or that more nodes can broadcast per cycle 402. Further, the broadcast slots can be dynamically assigned using the USAP approach.

Each frame 404 can also include multiple frequency channels 410. In FIG. 4, "F" different frequency channels are illustrated in the representative frame. Different embodiments of the invention include different numbers of time slots 406, channels 410 and/or frames 404. To determine whether a slot and a channel are available for allocation to a broadcast or a unicast transmission, the USAP methodology of incorporated U.S. Pat. No. 5,719,868 may be applied. Other alternative methodologies exist, however, and can be used in lieu of the USAP methodology.

Dynamic assignment protocols, USAP for example, can include techniques for establishing and maintaining an adaptive broadcast channel using a transmitter based broadcast or a receiver directed broadcast. Both types of broadcast can be based on a distance-2 vertex coloring of the network graph that provides contention-free transmissions by allowing reuse of any slot only after two hops. As noted in the incorporated material, other schemes can be employed as well. Another scheme, for example, may permit reuse of a slot only if separated by three (or more) hops.

Figure 5:
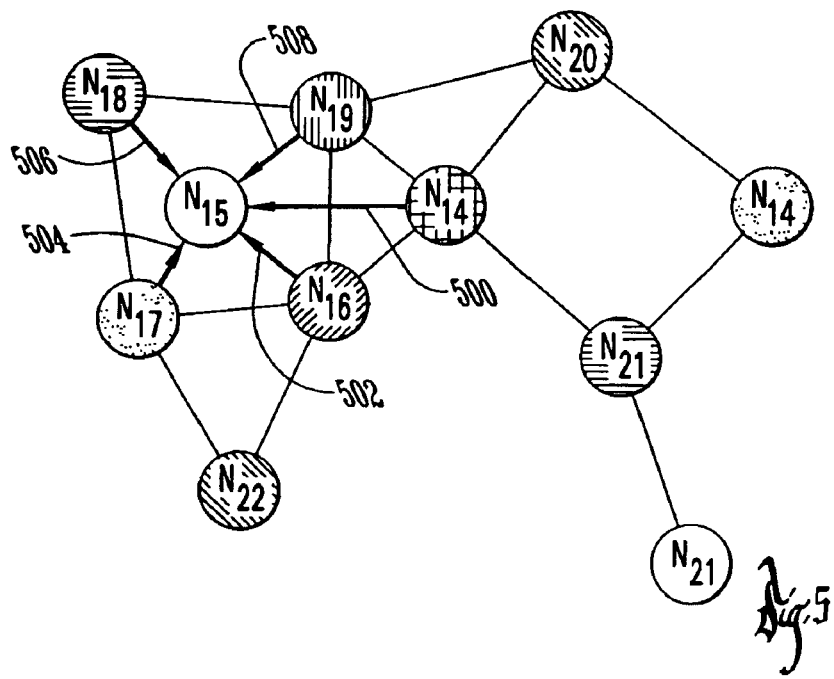
FIG. 5 is a diagram depicting a receiver directed form of communication.

FIG. 5 illustrates a receiver directed assignment of a receive slot. The map coloring is the same as that used in FIGS. 2 and 3. In FIG. 5, node $N_{15}$ has five neighbor nodes $N_{14}$, $N_{15}$, $N_{17}$, $N_{18}$, $N_{19}$. Node $N_{15}$ has assigned itself a receive slot. In one embodiment, a node such as node $N_{15}$ may assign to itself a receive slot that is designated for reception of a transmission from one neighbor node. In this embodiment, only one communication, the communication 500 from node $N_{14}$ to node $N_{15}$ for example, would take place during the receiver assigned receive slot.

In other embodiments, a node assigns itself a receive slot designated for use by two, three, four or more of its neighbors. Referring to FIG. 5, for example, such embodiments would involve receive slot transmissions 500, 502, 504, 506, 508 from various combinations of two, three or four of node $N_{15}$'s neighboring nodes. In yet another embodiment, a node assigns itself a broadcast receive slot in which all of its neighbors can transmit to it. FIG. 5 provides an example of a receiver directed broadcast slot wherein all five of node $N_{15}$'s neighbors are transmitting 500, 502, 504, 506, 508. It need not be required, however, that all neighbor nodes transmit during a receiver directed broadcast slot. In many applications, only one or a subset of the neighbors will transmit during a given RDB slot.

patent application Ser. No. 09/340,585, filed on Jun. 28, 1999, includes a disclosure of a USAP Multiple Access system. The entire specification, including any and all drawing figures and appendices, of application Ser. No. 09/340,585, filed Jun. 28, 1999, is hereby incorporated herein by this reference. In USAP Multiple Access, the transmitter based broadcast occurs in the broadcast slots and standby slots of the TDMA structure. Dedicated unicast reservations replace and use the standby slots as needed. The use of the standby slots is keyed to the broadcast slots so that a node that assigns itself a particular broadcast slot is entitled to the use of the corresponding standby slots.

The present invention. Multiple Broadcast Access (MBA), will be explained within the context of USAP. Although USAP MBA will be described for demonstrative purposes, it will be appreciated that other protocols can be used with the present invention. For example, it can be used with other dynamic assignment protocols.

The present invention is built on techniques for establishing and maintaining an adaptive broadcast channel using transmitter based broadcasts or receiver directed broadcasts. Both types of broadcast (transmitter based broadcast and RDB) can be based on a distance-2 vertex coloring of the network graph, enforced by USAP for example, for providing contention-free transmissions by allowing reuse of a communication slot only after a distance two hops. It will be appreciated that other embodiments of the invention can function in an environment requiring three, four (or more) hops of isolation before permitting slot reuse.

The basis of the present MBA invention is the observation that both types of broadcast, transmitter based broadcast and RDB, can use the same coloring of the network graph as long as each type is constrained to its own period of time. In USAP MA, the transmitter based broadcast occurs in the broadcast slots and standby slots of the USAP frame, while dedicated unicast reservations replace the standby slots as needed. The use of the standby slots is keyed to the broadcast slots so that a node that assigns itself a particular broadcast slot is entitled to the use of the corresponding standby slots.

The present invention also establishes a relationship between the broadcast and standby slots. In implementing the present invention, however, USAP MA is modified by replacing the standby transmitter based broadcast with standby RDB. In addition, reservations are based on RDB instead of dedicated unicast.

Therefore, instead of identifying the slots during which it will transmit, a node identifies those standby and reservation slots in which it will be prepared to receive. Transmitter based broadcast is still used for the broadcast slots. As explained in further detail below, utilizing existing RDB allocations for reservations instead of dedicated unicast, results in improved efficiency and significant savings in bootstrap overhead. Of import for networks having a larger number of channels to manage, this overhead grows linearly with maximum neighborhood density instead of as the product of the number of slots times the number of channels.

Figure 6:
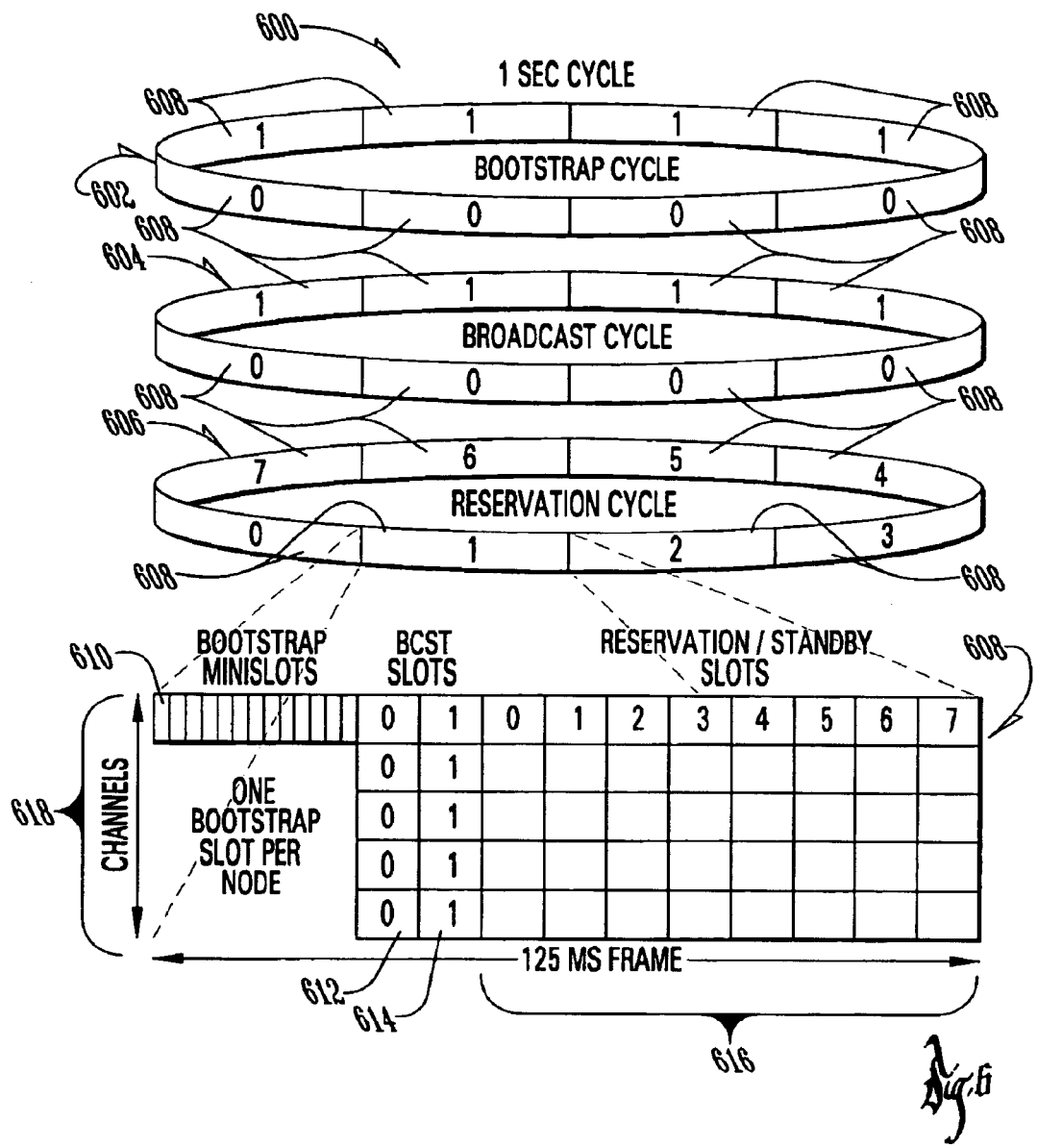
FIG. 6 is a diagram depicting an example of a time division multiple access structure that can be utilized with dynamic assignment protocol such as USAP, USAP Multiple Access or USAP Multiple Broadcast Access.

One embodiment of a TDMA structure suitable for use with the present invention is depicted in FIG. 6. The embodiment of FIG. 6 is similar to the basic structure presented in FIG. 4. Other structures can also be used with the present invention. The particular structure employed will depend on the demands of the application at hand.

The TDMA structure 600 of the embodiment of FIG. 6 may be viewed as having three individual cycles: a bootstrap cycle 602, a broadcast cycle 604 and a reservation cycle 606. Each of the cycles can have a one second duration that is divided into eight frames 608 each having a duration of 125 milliseconds. The number and length of each cycle, as well as the length of each frame, is a design choice governed by the application being served. Consequently, such details should not be viewed as limiting the scope of the invention. Other values and numbers are also considered to be within the scope of the invention. Each frame 608 can include a number of bootstrap slots or minislots 610, broadcast slots 612, 614, and "reservation"/"standby broadcast" slots 616. In addition, each frame 608 can include one, two or more frequency channels 618.

A frame 608 duration of 125 milliseconds is acceptable for voice latency, it evenly and fully fills a one second cycle with eight frames and it permits a manageable number of slots per frame. The bootstrap slots 610 are used for sharing information necessary to dynamically assign the remaining slots. Thus, their function is similar to that of the broadcast slots 408 of FIG. 4. In an embodiment having thirteen bootstrap slots 610 per frame 608 and a bootstrap cycle 602 of four frames, for example, up to fifty-two nodes can be supported. It will be appreciated that techniques for managing even larger networks can also be incorporated into the system when necessary.

Broadcast slot 612, 614 allocations are made to support a datagram service and any other control traffic that the nodes may need to share. In the present invention, these slots are assigned by the transmitter based broadcast technique. For a broadcast cycle 604 having four frames, up to eight nodes can transmit in the two broadcast slots 612, 614. In an embodiment having five different channels 618, as many as forty nodes can transmit in the broadcast slots 612, 614.

In the present invention, the reservation/standby broadcast slots 616 are assigned by the RDB technique. By way of contrast, the standby broadcast slot assignments are accomplished as transmitter based broadcasts and the reservation slots are dedicated unicast assignments in USAP MA. Since reservation/standby broadcast slots 616 repeat every frame, their latency in the above embodiment is 125 milliseconds. When a reservation slot 616 has not been allocated, it acts as a standby broadcast slot assigned via a RDB to the same node as the corresponding broadcast slot 612, 614.

In another embodiment, suitable for use with various communication structures, the broadcast slots 612, 614 are virtual broadcast slots. If, for example, the system does not need to use broadcast communications or if the bootstrap can handle the broadcast traffic required to manage the network, the reservation capacity can be increased by replacing the broadcast slots 612, 614 with additional standby slots. Thus, in the context of FIG. 6, all ten slots 612, 614, 616 would be standby slots. "Virtual" broadcast slots are employed to provide the functionality otherwise provided by the "real" broadcast slots. The virtual broadcast slots function the same as real broadcast slots, but they are not used for transmissions. In other words, virtual broadcast slots appear in the bootstrap, their impact on management of the standby slots is the same, and their schedules can be optimized. However, since virtual broadcast slots do not have a physical presence in the frame, their only impact is the role they play in determining how the standby slots are used. Thus, the broadcast slots used with the present invention can be "real" or "virtual" broadcast slots.

The savings obtained via the use of an implicit reservation scheme is made apparent by considering the USAP MBA bootstrap. In the following embodiment of USAP MBA for example, overhead is reduced from sixteen bytes to nine bytes. It will be demonstrated that if implicit reservations are used, overhead in such an embodiment can be further decreased to six bytes.

The following embodiment discloses a bootstrap format, suitable for use with the present invention, which is designed to handle a neighborhood of up to thirty-two nodes. In this embodiment, which can also be used in a USAP system, the bootstrap only contains information for up to eight neighbors at a time. It can be scaled up for larger neighborhoods by splitting the information over multiple bootstraps.

A node can indicate a split bootstrap by using range bits that are passed in the bootstrap. In this embodiment, only two range bits are necessary: Ranges of sixteen and thirty-two nodes, for example, require the bootstrap information to be split over two and four bootstraps respectively. Provision of a greater number of range bits can be made to include larger neighborhoods. A node receiving a split bootstrap can determine which part of the total information a particular bootstrap packet contains by examining the relative time at which it was received. For example, if the nodes are synchronized to two seconds and there are at least four bootstraps per second, then up to thirty-one neighbor nodes can be reported in a two second period.

Figure 7:
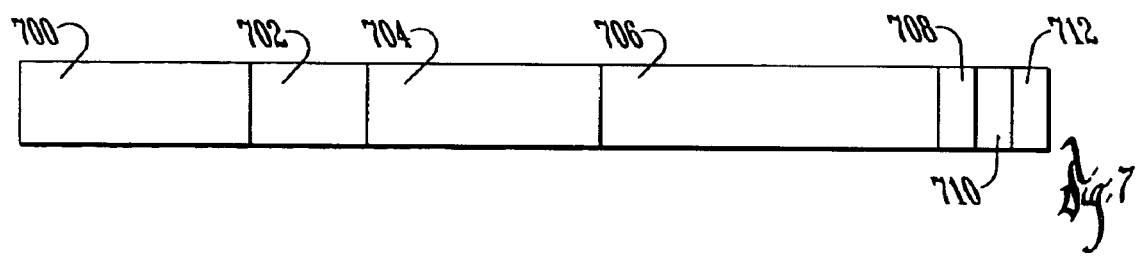
FIG. 7 depicts an embodiment of a format for a bootstrap packet suitable for use with the present invention.

FIG. 7 depicts an embodiment of a format for a bootstrap packet suitable for use with the present invention. In this USAP based embodiment, data on the "broadcast slots" 700 is encoded as a map of two bit fields that correspond to every one of eight slots. The bootstrap space required for conveying this information is sixteen bits (2 bits*8 slots=16 bits). The value of the field can convey the following meanings: "0" indicates that the slot is unassigned, "1" indicates a "self transmit" slot, "2" indicates a "self receive" slot and "3" indicates a "conflict" in the slot. The broadcast slot fields are used by a node to announce a "self transmit" for its own slot and either "unassigned," "self receive" or "conflict" for other slots. If a node sees two of its neighbors announcing "self transmit" for the same slot it will report a "conflict" in that slot, otherwise it will indicate "self receive."

Data on the "standby transmit slots" 702 is encoded as a map of one bit fields that correspond to every one of this node's transmit slots. Eight bits of bootstrap space is needed for this information (1 bit*8slots=8 bits). The value passed in the field can be given the following meanings: "0," indicates that the slot is unassigned, and "1" indicates a "self transmit" slot. The standby transmit slot fields are used by a node to announce whether or not it wishes to transmit in each slot. Announcing a "self transmit" in this slot blocks any other neighbor from reserving it since a node has priority over the use of its own transmit slots.

Data on the "standby/reservation receive slots" 704 is encoded as a map of two bit fields that correspond to every one of this node's receive slots. Sixteen bits is required to convey this data (2 bits*8 slots=16 bits). The value of the field can convey the following meanings: "0" indicates that the slot is unassigned, "1" indicates a "self receive from owner" slot, "2" indicates a "self receive from borrower" slot and "3" indicates a "conflict" in the slot.

The standby/reservation receive slot fields are used by a node to announce for each receive slot whether any other node is currently transmitting to it using a standby or reservation transmit slot. If more than one node is trying to transmit to it in a slot, it will announce "conflict." Note that if one of those nodes is using its own standby transmit slot, it does not need to abandon it.

Data on the "reservation transmit slots" 706 is encoded as two maps of one bit fields that correspond to up to two neighbor's receive slots that this node would like to reserve. Six bits are needed for the neighbor identification information (3 bits*2 neighbors=6 bits) and sixteen bits are required for slot status information (1 bit*8 slots*2 neighbors=16 bits). Thus, a total of twenty-two bits is needed for this embodiment. The value of the field can convey the following meanings: "0" indicates that the slot is unassigned, and "1" indicates a "self receive from owner" slot. Other embodiments can be structured so that the receive slots of three (or more) neighbors can be borrowed.

Finally, the reservation transmit slot fields are used if a node wishes to explicitly reserve one or more of a neighbor's receive slots. It can be used, for example, to explicitly reserve slots for setting up virtual circuits. In such cases, it specifies the neighbor in terms of its broadcast slot and the slots it wishes to reserve. In this embodiment, space is available for reserving up to two neighbors' slots explicitly, but implicit reservations are also available as described below.

The bootstrap can also include fields for identifying the broadcast slot selected 708, for indicating the range of the bootstrap 710 and for transmitting synchronization data 712. In the above USAP MBA embodiment, there are five bits to indicate which of up to thirty-two broadcast slots is chosen by this node, two bits to indicate the range of the highest broadcast slot chosen by a neighbor (4, 8, 16, 32), and one bit for two second synchronization. Thus, the bootstrap requires a total of fifty bits (about nine bytes) when the reservation transmit slots field is included.

Even though the bootstrap is smaller, communication between nodes in dense neighborhoods actually improves since each node can communicate with all of its thirty-one neighbors. In contrast, the channelized neighborhoods of USAP MA segregate a dense neighborhood into smaller groups, each on its own channel, with the result that certain neighbors can communicate only through relay. The above USAP MBA embodiment has no such restriction.

Referring now to the bootstrap portion of the frame, a field of the bootstrap can be used to explicitly reserve slots, for setting up virtual circuits for example. This "explicit reservation" technique takes a slot from an idle node and reassigns it to a node needing additional transmit capacity. This allows guaranteed capacity to be reserved even in the absence of user data. If desired, a node can reclaim its slot by indicating its intention in the standby transmit slots field of the bootstrap it generates.

In applications wherein some amount of initial packet loss and delay is tolerable, such as in voice or video applications, an explicit reservation technique is wasteful and inefficient. In such applications, an implicit reservations scheme has distinct advantages. An implicit reservation scheme allows traffic to be sent on demand and without prior reservation. It also saves a significant amount of room in the bootstrap by permitting removal of the field used for indicating explicit reservations.

The implicit reservation scheme is based on the fact that, in a RDB system, each of the nodes in the neighborhood knows that a non-transmitting node is always ready to receive on a particular channel. Therefore, if a node has excess traffic for a particular neighbor (beyond that of its normal broadcast and RDB slots) it can determine, via its stored USAP information for example, which slots are not currently reserved or blocked by other nodes. Upon identifying such slots, the node with excess communications can just start transmitting, without making an explicit reservation, in the unused slot or slots assigned to the intended receiver by the RDB scheme.

Upon noticing that it is receiving traffic in a slot, the receiving node can assume that the transmitting node has made an implicit reservation. The receiving node then announces that it is busy receiving in the slot. In a USAP system, for example, it starts announcing a 'self receive' in its standby/reservation receive bootstrap record. As a result of the announcement, other transmitters will refrain from implicitly reserving the slot.

Upon determining that the communication traffic has stopped, after a brief time out period for example, the receiving node can announce that the slot is once again unassigned. Further, if desired, the neighbor node owning the slot can be permitted to reclaim the slot for its own transmissions to the intended receiver. In a USAP system, for example, a neighbor node can accomplish such a result by announcing a self transmit in its standby transmit slot field. After determining that the owner is reclaiming the slot, the receiving node can announce a conflict and thereby cause any other neighbor node to abandon its implicit or explicit reservation.

Similarly, if numerous packets containing errors are received, the receiving node can be allowed to assume that more than one neighbor is trying to implicitly reserve the slot. In such an event, the receiving node can announce a conflict in the slot. The node or nodes implicitly reserving the slot will then abandon it.

Overall, a total of 50 bits, about 9 bytes, are needed for a USAP MBA bootstrap using explicit reservations. Use of an implicit reservation scheme instead of the explicit reservation scheme, however, permits the reservation transmit slot fields to be omitted from the bootstrap. Consequently, in this embodiment, the size of the bootstrap can be reduced 44 percent to 28 bits.

As noted, FIGS. 2 and 5 illustrate, respectively, transmitter based broadcast and receiver directed broadcast. In bootstrap and broadcast slots, a node such as node $N_{15}$ can use its slot to transmit, as in FIG. 2, to all of its neighbors at once. Likewise, a node such as node $N_{15}$ can receive from any of its neighbors, but only if one transmits at a time.

To prevent RDB collisions, the neighbors of node $N_{15}$ can be scheduled unique slot and channel combinations for transmissions to node $N_{15}$ that are keyed to the broadcast slot each is assigned. When desired, an "optimal RDB schedule" can be implemented. For example, an optimal schedule can be designed to fulfill the following requirements:

1. Use as many channels as possible to allow the maximum number of simultaneous transmissions to occur.
2. If a node wishes to use another node's transmission opportunity, it has an equal probability of effecting its own transmit and receive opportunities.
3. The schedules for sparser neighborhoods are imbedded within the schedules for denser neighborhoods.

The justification for the first requirement is that, under a uniform traffic load, maximum throughput can be achieved if all nodes are kept busy 100% of the time either transmitting or receiving. The number of channels (C) required to achieve this end is related to the number of nodes in the neighborhood (N), by the equation C=N/2. Likewise the number of slots (S) required, derives from the fact that every node must both transmit and receive from N−1 other nodes. Thus, the relation S=2(N−1) is obtained.

Figure 8:
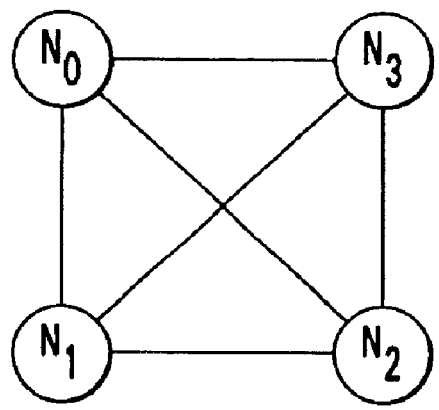
FIG. 8 depicts a four node neighborhood.

The second requirement is subtler and will be explained with the help of the following four node schedule. FIG. 8 depicts a four node neighborhood. The table below relates two channels (C1 and C2) to six slots (S0, S1, S2, S3, S4 and S5) for four nodes ($N_0$, $N_1$, $N_2$ and $N_3$) of FIG. 8.

TABLE 1

Optimized Four-Node Schedule

| Txer->Rxer | C0 | C1 |
|---|---|---|
| S0 | $N_0$->$N_1$ | $N_3$->$N_2$ |
| S1 | $N_1$->$N_0$ | $N_2$->$N_3$ |
| S2 | $N_0$->$N_2$ | $N_1$->$N_3$ |
| S3 | $N_2$->$N_0$ | $N_3$->$N_1$ |
| S4 | $N_0$->$N_3$ | $N_2$->$N_1$ |
| S5 | $N_3$->$N_0$ | $N_1$->$N_2$ |

In this schedule, node $N_0$ uses (S0, C0) as its primary slot for transmitting to node $N_1$. However, if node $N_2$ or node $N_3$ currently have no traffic for node $N_1$, then node $N_0$ can use their slots (S3, C1) and (S4, C1) on al reservation basis to communicate with node $N_1$. Node $N_0$'s use, however, of either one of these slots will reduce its own transmit and receive opportunities (S3, C0) and (S4, C0). Consequently, node $N_0$ must weigh its decision about which additional slots to reserve to node $N_1$, against its needs to communicate with the other nodes in its neighborhood. Presumably this decision is easier if all nodes have an equal choice between receive and transmit opportunities. Hence, the justification for the second requirement is established.

The optimal schedule for two nodes is (S0, C0) and (S1, C0). Notice that the two node schedule is imbedded in the four node schedule. A scheduling embodiment having the smaller schedules imbedded in the larger schedule, has the added benefit of permitting a smooth transition between neighborhoods of different densities (such as according to the USAP MA Adaptive Broadcast Cycles for example). A schedule satisfying all three requirements is considered "optimal."

Figure 9:
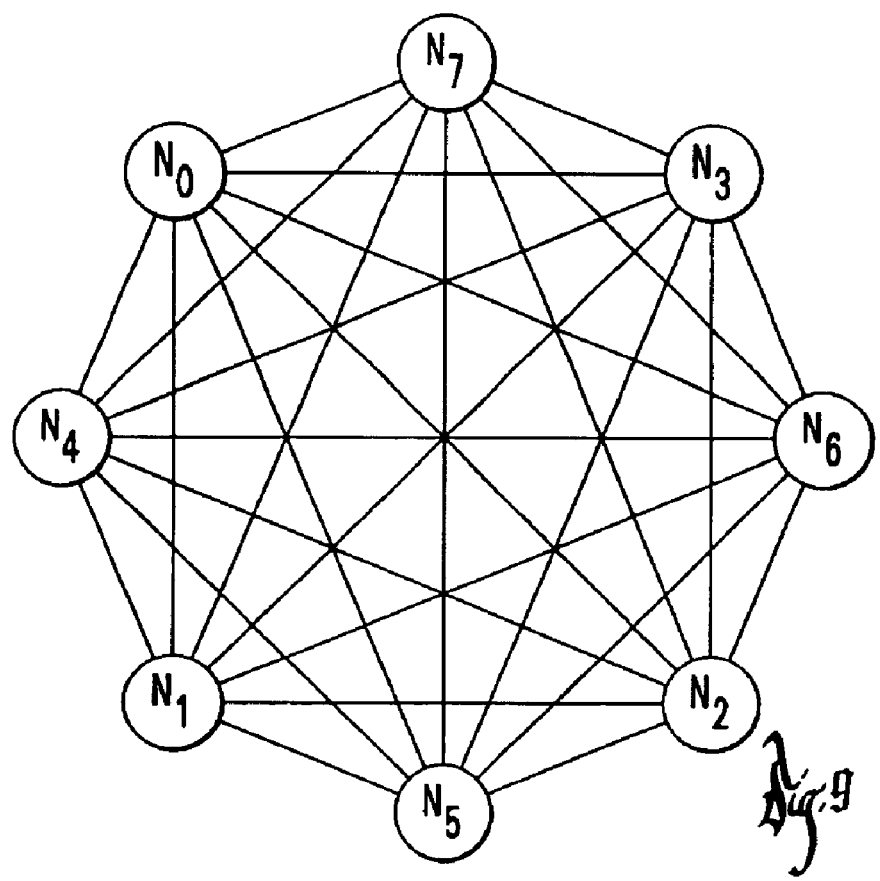
FIG. 9 depicts an eight node neighborhood.

FIG. 9 depicts an eight node neighborhood. An optimal eight node schedule for the neighborhood of FIG. 9 is listed below. Note that, in this embodiments, it embeds the optimal four node schedule. Four channels (C=N/2) and fourteen time slots (S=2(N−1)) are required for the optimal schedule for this eight node neighborhood.

TABLE 2

Optimized Eight-Node Schedule

| Txer->Rxer | C0 | C1 | C2 | C3 |
|---|---|---|---|---|
| S0 | $N_0$->$N_1$ | $N_3$->$N_2$ | $N_4$->$N_5$ | $N_7$->$N_6$ |
| S1 | $N_1$->$N_0$ | $N_2$->$N_3$ | $N_5$->$N_4$ | $N_6$->$N_7$ |
| S2 | $N_0$->$N_2$ | $N_1$->$N_3$ | $N_4$->$N_6$ | $N_5$->$N_7$ |
| S3 | $N_2$->$N_0$ | $N_3$->$N_1$ | $N_6$->$N_4$ | $N_7$->$N_5$ |
| S4 | $N_0$->$N_3$ | $N_2$->$N_1$ | $N_4$->$N_7$ | $N_8$->$N_5$ |
| S5 | $N_3$->$N_0$ | $N_1$->$N_2$ | $N_5$->$N_6$ | $N_7$->$N_4$ |
| S6 | $N_0$->$N_4$ | $N_1$->$N_6$ | $N_2$->$N_5$ | $N_3$->$N_7$ |
| S7 | $N_0$->$N_5$ | $N_1$->$N_4$ | $N_6$->$N_2$ | $N_7$->$N_3$ |
| S8 | $N_0$->$N_6$ | $N_2$->$N_4$ | $N_5$->$N_3$ | $N_7$->$N_1$ |
| S9 | $N_0$->$N_7$ | $N_3$->$N_4$ | $N_5$->$N_2$ | $N_8$->$N_1$ |
| S10 | $N_1$->$N_5$ | $N_2$->$N_6$ | $N_4$->$N_3$ | $N_7$->$N_0$ |
| S11 | $N_1$->$N_7$ | $N_3$->$N_5$ | $N_4$->$N_2$ | $N_8$->$N_0$ |
| S12 | $N_2$->$N_7$ | $N_3$->$N_6$ | $N_4$->$N_0$ | $N_5$->$N_1$ |
| S13 | $N_4$->$N_1$ | $N_5$->$N_0$ | $N_6$->$N_3$ | $N_7$->$N_2$ |

Thus, two, four and eight node RDB cycles can be handled by five channels. To scale to sixteen nodes optimally requires eight channels and thirty slots. An acceptable schedule can be achieved, however, by using five channels and 48 slots (i.e. are 120 ways of taking two of eight nodes, multiplied by two for transmit and receive, and divided by five channels). In general, $$S \equiv \binom{N}{2} \times \frac{2}{C} \equiv \frac{N!}{2!(N-2)!} \times \frac{2}{C} \equiv \frac{N(N-1)}{C}.$$

Accordingly, a 32 node schedule with five channels requires 199 slots.

FIG. 10 presents a frame suitable for the optimized eight node schedule presented above. This embodiment would have a maximum latency of 125 ms since every node can transmit to every other node in every frame. Note that this is the same latency as the current USAP MA eight node standby broadcast schedule, the difference being that each node has seven transmit slots instead of one.

Even though the RDB slots of embodiment of FIG. 10 are 50% shorter (due to the need for fourteen slots instead of eight), throughput is still tripled when most of the traffic is point-to-point. Having only five channels begins to be detrimental in the 16 and 32 node schedules, however, where latencies are about two and 3.5 times that of the standby broadcast schedule.

Assuming a heavy homogenous load (all nodes have packets to transmit whenever they are allowed to transmit and each destination is equally probable) and a uniform neighborhood density of N nodes, the throughput for USAP MBA can be easily derived. An equation that is valid for protocols in general and specifies the average number of concurrently transmitted packets k in terms of the throughput T, the path length L, and the probability of a path length pl is $$k = \sum_{L=1}^{\infty} TLpl$$

Note that k=N/2 for USAP MBA, so after substituting and rearranging $$T = N/2 \sum_{L=1}^{\infty} Lpl = N/2L_{avg},$$

which yields the throughput in terms of the neighborhood density and average path length. Thus, the throughput goes up in proportion to the neighborhood density as long as there are enough channels to satisfy C=N/2.

It is thought that the method and apparatus of the present invention will be understood from the description provided throughout this specification and the appended claims, and that it will be apparent that various changes may be made in the form, construct steps and arrangement of the parts and steps thereof, without departing from the spirit and scope of the invention or sacrificing all of their material advantages. The forms herein described are merely exemplary embodiments thereof.

What is claimed is:

1. A method for managing an adaptive broadcast channel in a network having nodes communicating via scheduled time slots on a time multiplex basis, comprising:
   establishing a broadcast schedule having a plurality of transmit broadcast slots;
   associating at least one standby communication slot with at least one transmit broadcast slot of the broadcast schedule;
   assigning a specific transmit broadcast slot to a specific node of the network, the specific node being then permitted to transmit a broadcast message during the specific transmit broadcast slot;
   designating at least one of the at least one standby communication slot associated with the specific transmit broadcast slot to be used by the specific node for reception of communications; and
   indicating a status of the designated standby communication slot, wherein another node of the network may use the at least one designated standby communication slot to transmit to the specific node.

2. The method of claim 1, wherein said indicating signals whether the designated standby communication slot is currently being used to receive a communication.

3. The method of claim 1, wherein said indicating signals whether a transmission conflict exists in the designated standby communication slot.

4. The method of claim 1, further comprising relating a specific neighbor node with at least one of the designated standby communication slots, wherein the specific neighbor node can use the at least one related designated standby communication slot to transmit to the specific node.

5. The method of claim 4, further comprising transmitting in the related designated standby communication slot when it is not being used for communication by the specific node or the specific neighbor node related thereto, the transmission being performed without prior reservation, and the transmission being performed by a transmitting node other than the specific neighbor node related to the designated standby communication slot.

6. The method of claim 4, further comprising explicitly reserving, by a transmitting node other than the specific neighbor node, at least one of the designated standby communication slots related to the specific neighbor node, the at least one explicitly reserved standby communication slot not being currently used for communication by the specific neighbor node, and wherein the transmitting node reserves the at least one explicitly reserved standby communication slot in order to transmit to the specific node.

7. The method of claim 1, wherein said establishing further comprises optimizing the broadcast schedule to prevent collisions in the at least one standby communication slot by scheduling unique time slot and channel combinations that are keyed to the transmit broadcast slot assigned to each neighbor of the specific node.

8. The method of claim 7, wherein said optimizing o further comprises the step of determining how many channels and time slots are required to handle an expected maximum number of simultaneous transmissions in the network.

9. The method of claim 8, wherein said determining comprises calculating how many channels are required by solving C=N/2, and calculating how many time slots are required by solving S=2(N−1), where C represents the number of channels being determined, S represents the number of time slots being determined, and N represents the number of nodes in the neighborhood of the receiving nodes.

10. The method according to claim 4, further comprising optimizing the broadcast schedule in a manner such that when a first node is determining whether to transmit in a designated standby communication slot related to another node, any available option will carry a substantially equal probability of blocking the first node's own opportunity to transmit and of blocking its own opportunity to receive.

11. The method of claim 8, wherein said determining comprises calculating how many time slots are required according to:

$$S \equiv \frac{N(N-1)}{C}$$

where C represents a fixed number of channels, S represents how many time slots are required, and N represents the number of nodes in the neighborhood of the receiving nodes.

* * * * *